United States Patent
Kadowaki et al.

(10) Patent No.: US 7,474,792 B2
(45) Date of Patent: Jan. 6, 2009

(54) IMAGE PROCESSING APPARATUS FOR USING DISTORTION AMOUNT INFORMATION

(75) Inventors: Yukio Kadowaki, Nara (JP); Shogo Oneda, Chiba (JP); Tooru Suino, Kanagawa (JP); Keiichi Suzuki, Tokyo (JP); Yutaka Sano, Miyagi (JP); Takanori Yano, Kanagawa (JP); Minoru Fukuda, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 874 days.

(21) Appl. No.: 10/726,876

(22) Filed: Dec. 2, 2003

(65) Prior Publication Data
US 2004/0146209 A1    Jul. 29, 2004

(30) Foreign Application Priority Data

Dec. 2, 2002    (JP) .............................. 2002-349595
Dec. 2, 2002    (JP) .............................. 2002-349640

(51) Int. Cl.
*G06K 9/36*    (2006.01)
*G06K 9/46*    (2006.01)

(52) U.S. Cl. ........................................ 382/233; 382/240
(58) Field of Classification Search ........................ None
See application file for complete search history.

(56) References Cited

U.S. PATENT DOCUMENTS

| | | | | |
|---|---|---|---|---|
| 5,416,604 A | * | 5/1995 | Park | 382/232 |
| 5,959,981 A | * | 9/1999 | Bruckert et al. | 370/331 |
| 6,014,473 A | * | 1/2000 | Hossack et al. | 382/294 |
| 6,023,563 A | * | 2/2000 | Shani | 709/249 |
| 6,031,939 A | * | 2/2000 | Gilbert et al. | 382/239 |
| 6,141,453 A | * | 10/2000 | Banham et al. | 382/240 |
| 6,339,658 B1 | * | 1/2002 | Moccagatta et al. | 382/240 |
| 6,553,147 B2 | * | 4/2003 | Chai et al. | 382/240 |
| 6,661,927 B1 | * | 12/2003 | Suarez et al. | 382/240 |
| 6,756,921 B2 | * | 6/2004 | Kimura et al. | 341/50 |
| 6,778,709 B1 | * | 8/2004 | Taubman | 382/240 |
| 7,006,576 B1 | * | 2/2006 | Hannuksela | 375/240.27 |
| 7,076,104 B1 | * | 7/2006 | Keith et al. | 382/233 |
| 7,136,532 B2 | * | 11/2006 | Van Der Schaar | 382/233 |

FOREIGN PATENT DOCUMENTS

| | | |
|---|---|---|
| JP | 2000-101537 | 4/2000 |
| JP | 2001-274861 | 10/2001 |

OTHER PUBLICATIONS

Sections 6-7, Annex D.5, J.7 and J.14, ISO/IEC 15444-1, 1st Edition, Dec. 15, 2000, hereafter referred to as 15444-1.*

(Continued)

*Primary Examiner*—Matthew C Bella
*Assistant Examiner*—Yuzhen Ge
(74) *Attorney, Agent, or Firm*—Blakely, Sokoloff, Taylor & Zafman LLP

(57) ABSTRACT

In an image processing apparatus, using distortion amount information showing how much a decoded image is degraded from an original image when data are eliminated from the data sequence is read from a code sequence in which the original image is compressed and encoded, an occurrence of an error in each unit of the code sequence is detected. A distortion amount of the decoded image against the original image is calculated when the code sequence is decoded after the data are eliminated from the code sequence by using the distortion amount information concerning the data in which the error is detected. Then, the decoding of the code sequence is cancelled based on a calculation result.

7 Claims, 16 Drawing Sheets

OTHER PUBLICATIONS

Sections 6-7, Annex D.5, J.7 and J.14, ISO/IEC 15444-1, 1st Edition, Dec. 15, 2000, hereafter referred to as 15444-1.*

Two snapshots showing Adobe Acrobat informs a user an error when opening a file not in Adobe Acrobat format.*

* cited by examiner

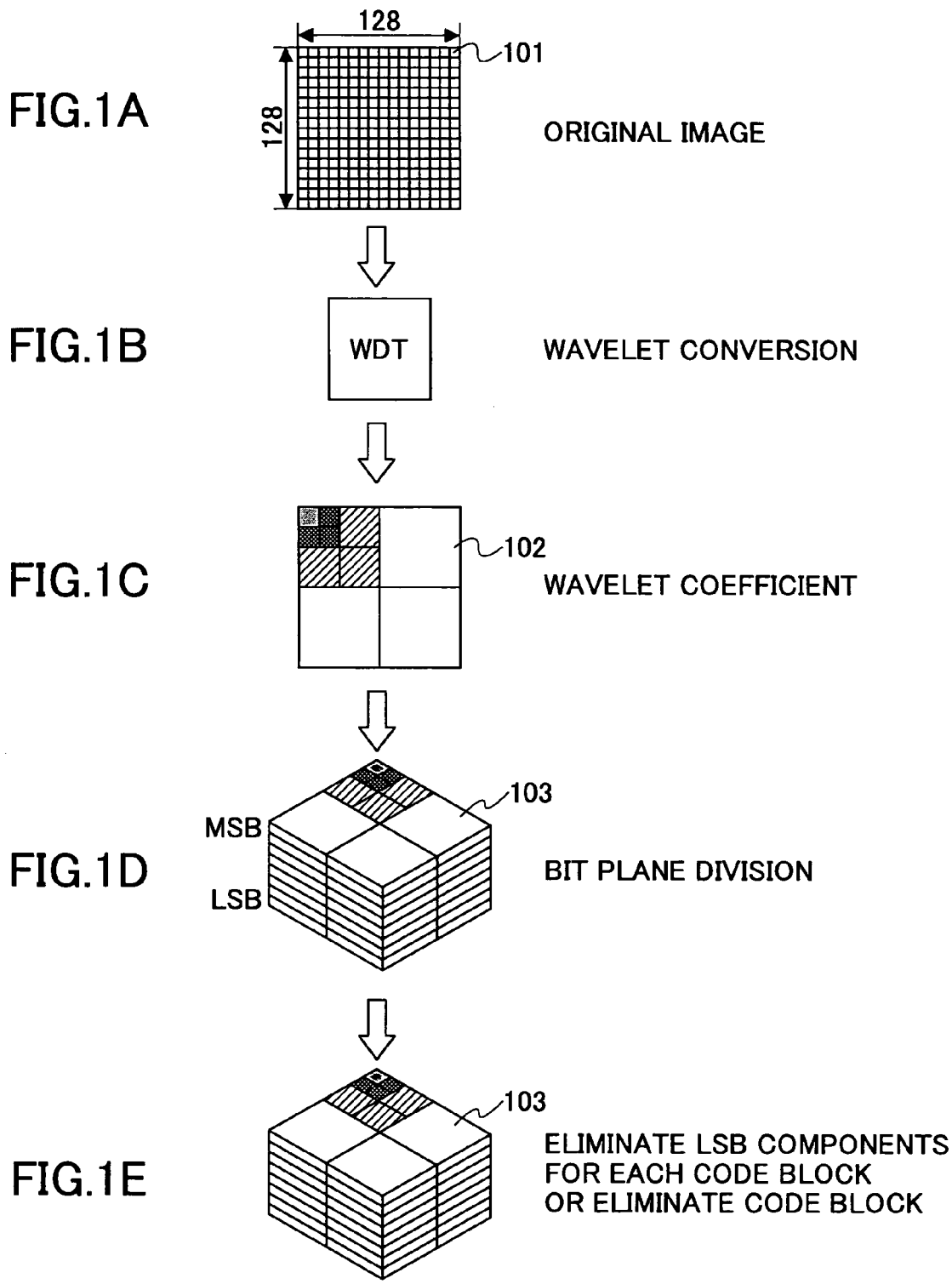

FIG.3

| 0 | 1 | 4 | | 7 | 8 | 19 | 20 | 21 | 22 | 67 | 68 | 69 | 70 | 71 | 72 | 73 | 74 |
|---|---|---|---|---|---|----|----|----|----|----|----|----|----|----|----|----|----|
| 2 | 3 |   |   |   |   |    |    |    |    |    |    |    |    |    |    |    |    |
| 5 | 6 | 9 | 10 | 23 | 24 | 25 | 26 | 75 | 76 | 77 | 78 | 79 | 80 | 81 | 82 |
| 11 | 12 | 15 | 16 | 27 | 28 | 29 | 30 | 83 | 84 | 85 | 86 | 87 | 88 | 89 | 90 |
| 13 | 14 | 17 | 18 | 31 | 32 | 33 | 34 | 91 | 92 | 93 | 94 | 95 | 96 | 97 | 98 |
| 35 | 36 | 37 | 38 | 51 | 52 | 53 | 54 | 99 | 100 | 101 | 102 | 103 | 104 | 105 | 106 |
| 39 | 40 | 41 | 42 | 55 | 56 | 57 | 58 | 107 | 108 | 109 | 110 | 111 | 112 | 113 | 114 |
| 43 | 44 | 45 | 46 | 59 | 60 | 61 | 62 | 115 | 116 | 117 | 118 | 119 | 120 | 121 | 122 |
| 47 | 48 | 49 | 50 | 63 | 64 | 65 | 66 | 123 | 124 | 125 | 126 | 127 | 128 | 129 | 130 |
| 131 | 132 | 133 | 134 | 135 | 136 | 137 | 138 | 195 | 196 | 197 | 198 | 199 | 200 | 201 | 202 |
| 139 | 140 | 141 | 142 | 143 | 144 | 145 | 146 | 203 | 204 | 205 | 206 | 207 | 208 | 209 | 210 |
| 147 | 148 | 149 | 150 | 151 | 152 | 153 | 154 | 211 | 212 | 213 | 214 | 215 | 216 | 217 | 218 |
| 155 | 156 | 157 | 158 | 159 | 160 | 161 | 162 | 219 | 220 | 221 | 222 | 223 | 224 | 225 | 226 |
| 163 | 164 | 165 | 166 | 167 | 168 | 169 | 170 | 227 | 228 | 229 | 230 | 231 | 232 | 233 | 234 |
| 171 | 172 | 173 | 174 | 175 | 176 | 177 | 178 | 235 | 236 | 237 | 238 | 239 | 240 | 241 | 242 |
| 179 | 180 | 181 | 182 | 183 | 184 | 185 | 186 | 243 | 244 | 245 | 246 | 247 | 248 | 249 | 250 |
| 187 | 188 | 189 | 190 | 191 | 192 | 193 | 194 | 251 | 252 | 253 | 254 | 255 | 256 | 257 | 258 |

FIG.8

CASE OF RLOP

| 0 | Y_lay0 | 0 | Cb_lay0 | 0 | Cb_lay0 | 0 | Y_lay1 | 0 | Cb_lay1 | 0 | Cb_lay1 | 0 | Y_lay2 | 0 | Cb_lay2 |
| 0 | Cb_lay2 | 0 | Y_lay3 | 0 | Cb_lay3 | 0 | Cb_lay3 | 1 | 2 | 3 | Y_lay0_1 | Y_lay0_2 | Y_lay0_3 |
| 1 | 2 | 3 | Cb_lay0_1 | Cb_lay0_2 | Cb_lay0_3 | 1 | 2 | 3 | Cr_lay0_1 | Cr_lay0_2 | Cr_lay0_3 | 1 | 2 | 3 | Y_lay1_1 |
| Y_lay1_2 | Y_lay1_3 | 1 | 2 | 3 | Cb_lay1_1 | Cb_lay1_2 | Cb_lay1_3 | 1 | 2 | 3 | Cr_lay1_1 | Cr_lay1_2 |
| Cr_lay1_3 | 1 | 2 | 3 | Y_lay2_1 | Y_lay2_2 | Y_lay2_3 | 1 | 2 | 3 | Cb_lay2_1 | Cb_lay2_2 | Cb_lay2_3 |
| 1 | 2 | 3 | Cr_lay2_1 | Cr_lay2_2 | Cr_lay2_3 | 1 | 2 | 3 | Y_lay3_1 | Y_lay3_2 | Y_lay3_3 | 1 | 2 | 3 | Cb_lay3_1 |
| Cb_lay3_2 | Cb_lay3_3 | 1 | 2 | 3 | Cr_lay3_1 | Cr_lay3_2 | Cr_lay3_3 | 4 | 5 | 6 | Y_lay0_4 | Y_lay0_5 |
| Y_lay0_6 | 4 | 5 | 6 | Cb_lay0_4 | Cb_lay0_5 | Cb_lay0_6 | 4 | 5 | 6 | Cr_lay0_4 | Cr_lay0_5 | Cr_lay0_6 |
| 4 | 5 | 6 | Y_lay1_4 | Y_lay1_5 | Y_lay1_6 | 4 | 5 | 6 | Cb_lay1_4 | Cb_lay1_5 | Cb_lay1_6 | 4 | 5 | 6 | Cr_lay1_4 |
| Cr_lay1_5 | Cr_lay1_6 | 4 | 5 | 6 | Y_lay2_4 | Y_lay2_5 | Y_lay2_6 | 4 | 5 | 6 | Cb_lay2_4 | Cb_lay2_5 |
| Cb_lay2_6 | 4 | 5 | 6 | Cr_lay2_4 | Cr_lay2_5 | Cr_lay2_6 | 4 | 5 | 6 | Y_lay1_4 | Y_lay1_5 | Y_lay1_6 |
| 4 | 5 | 6 | Cb_lay3_4 | Cb_lay3_5 | Cb_lay3_6 | 4 | 5 | 6 | Cr_lay3_4 | Cr_lay3_5 | Cr_lay3_6 |

FIG.9

CASE OF RPCL

| 0 | Y_lay0 | 0 | Y_lay1 | 0 | Y_lay2 | 0 | Y_lay3 | 0 | Cb_lay0 | 0 | Cb_lay1 | 0 | Cb_lay2 | 0 | Cb_lay3 |

| 0 | Cr_lay0 | 0 | Cr_lay1 | 0 | Cr_lay2 | 0 | Cr_lay3 | 1 2 3 | Y_lay0_1 | Y_lay0_2 | Y_lay0_3 |

| 1 2 3 | Y_lay1_1 | Y_lay1_2 | Y_lay1_3 | 1 2 3 | Y_lay2_1 | Y_lay2_2 | Y_lay2_3 | 1 2 3 |

| Y_lay3_1 | Y_lay3_2 | Y_lay3_3 | 1 2 3 | Cb_lay0_1 | Cb_lay0_2 | Cb_lay0_3 | 1 2 3 | Cr_lay1_1 |

| Cr_lay1_2 | Cr_lay1_3 | 1 2 3 | Cb_lay2_1 | Cb_lay2_2 | Cb_lay2_3 | 1 2 3 | Cb_lay3_1 | Cb_lay3_2 |

| Cb_lay3_3 | 1 | 2 | 3 | Cb_lay0_1 | Cb_lay0_2 | Cb_lay0_3 | 1 | 2 | 3 | Cr_lay1_1 | Cr_lay1_2 | Cr_lay1_3 |

| 1 | 2 | 3 | Cr_lay2_1 | Cr_lay2_2 | Cr_lay2_3 | 1 | 2 | 3 | Cr_lay3_1 | Cr_lay3_2 | Cr_lay3_3 | 4 5 6 |

| Y_lay0_4 | Y_lay0_5 | Y_lay0_6 | 4 5 6 | Y_lay1_4 | Y_lay1_5 | Y_lay1_6 | 4 5 6 | Y_lay2_4 |

| Y_lay2_5 | Y_lay2_6 | 4 5 6 | Y_lay1_4 | Y_lay1_5 | Y_lay1_6 | 4 5 6 | Cb_lay0_4 | Cb_lay0_5 |

| Cb_lay0_6 | 4 5 6 | Cr_lay1_4 | Cr_lay1_5 | Cr_lay1_6 | 4 5 6 | Cb_lay2_4 | Cb_lay2_5 | Cb_lay2_6 |

| 4 5 6 | Cb_lay3_4 | Cb_lay3_5 | Cb_lay3_6 | 4 | 5 | 6 | Cr_lay0_4 | Cr_lay0_5 | Cr_lay0_6 | 4 | 5 | 6 |

| Cr_lay1_4 | Cr_lay1_5 | Cr_lay1_6 | 4 | 5 | 6 | Cr_lay2_4 | Cr_lay2_5 | Cr_lay2_6 | 4 | 5 | 6 | Cr_lay3_4 |

| Cr_lay3_5 | Cr_lay3_6 |

FIG.10

CASE OF PCRL

| 0 | Y_lay0 | 0 | Y_lay1 | 0 | Y_lay2 | 0 | Y_lay3 | 1 | 2 | 3 | Y_lay0_1 | Y_lay0_2 | Y_lay0_3 | 1 | 2 | 3 | Y_lay1_1 |
| Y_lay1_2 | Y_lay1_3 | 1 | 2 | 3 | Y_lay2_1 | Y_lay2_2 | Y_lay2_3 | 1 | 2 | 3 | Y_lay3_1 | Y_lay3_2 | Y_lay3_3 |
| 4 | 5 | 6 | Y_lay0_4 | Y_lay0_5 | Y_lay0_6 | 4 | 5 | 6 | Y_lay1_4 | Y_lay1_5 | Y_lay1_6 | 4 | 5 | 6 | Y_lay2_4 |
| Y_lay2_5 | Y_lay2_6 | 4 | 5 | 6 | Y_lay1_4 | Y_lay1_5 | Y_lay1_6 | 0 | Cb_lay0 | 0 | Cb_lay1 | 0 | Cb_lay2 | 0 |
| Cr_lay3 | 1 | 2 | 3 | Cb_lay0_1 | Cb_lay0_2 | Cb_lay0_3 | 1 | 2 | 3 | Cb_lay1_1 | Cb_lay1_2 | Cb_lay1_3 | 1 | 2 | 3 |
| Cb_lay2_1 | Cb_lay2_2 | Cb_lay2_3 | 1 | 2 | 3 | Cb_lay3_1 | Cb_lay3_2 | Cb_lay3_3 | 4 | 5 | 6 | Cb_lay0_4 | Cb_lay0_5 |
| Cb_lay0_6 | 4 | 5 | 6 | Cb_lay1_4 | Cb_lay1_5 | Cb_lay1_6 | 4 | 5 | 6 | Cb_lay2_4 | Cb_lay2_5 | Cb_lay2_6 | 4 | 5 | 6 |
| Cb_lay3_4 | Cb_lay3_5 | Cb_lay3_6 | 0 | Cb_lay0 | 0 | Cb_lay1 | 0 | Cb_lay2 | 0 | Cb_lay3 | 1 | 2 | 3 | Cr_lay0_1 |
| Cr_lay0_2 | Cr_lay0_3 | 1 | 2 | 3 | Cr_lay1_1 | Cr_lay1_2 | Cr_lay1_3 | 1 | 2 | 3 | Cr_lay2_1 | Cr_lay2_2 | Cr_lay2_3 |
| 1 | 2 | 3 | Cr_lay3_1 | Cr_lay3_2 | Cr_lay3_3 | 4 | 5 | 6 | Cb_lay0_4 | Cr_lay0_5 | Cr_lay0_6 | 4 | 5 | 6 | Cr_lay1_4 |
| Cr_lay1_5 | Cr_lay1_6 | 4 | 5 | 6 | Cr_lay2_4 | Cr_lay2_5 | Cr_lay2_6 | 4 | 5 | 6 | Cr_lay3_4 | Cr_lay3_5 | Cr_lay3_6 |
| 7 | 8 | 9 | 10 | 11 | 12 | 13 | 14 | 15 | 16 | 17 | 18 | Cr_lay0_7 | Cr_lay0_8 | Cr_lay0_9 | Cr_lay0_10 | Cr_lay0_11 |

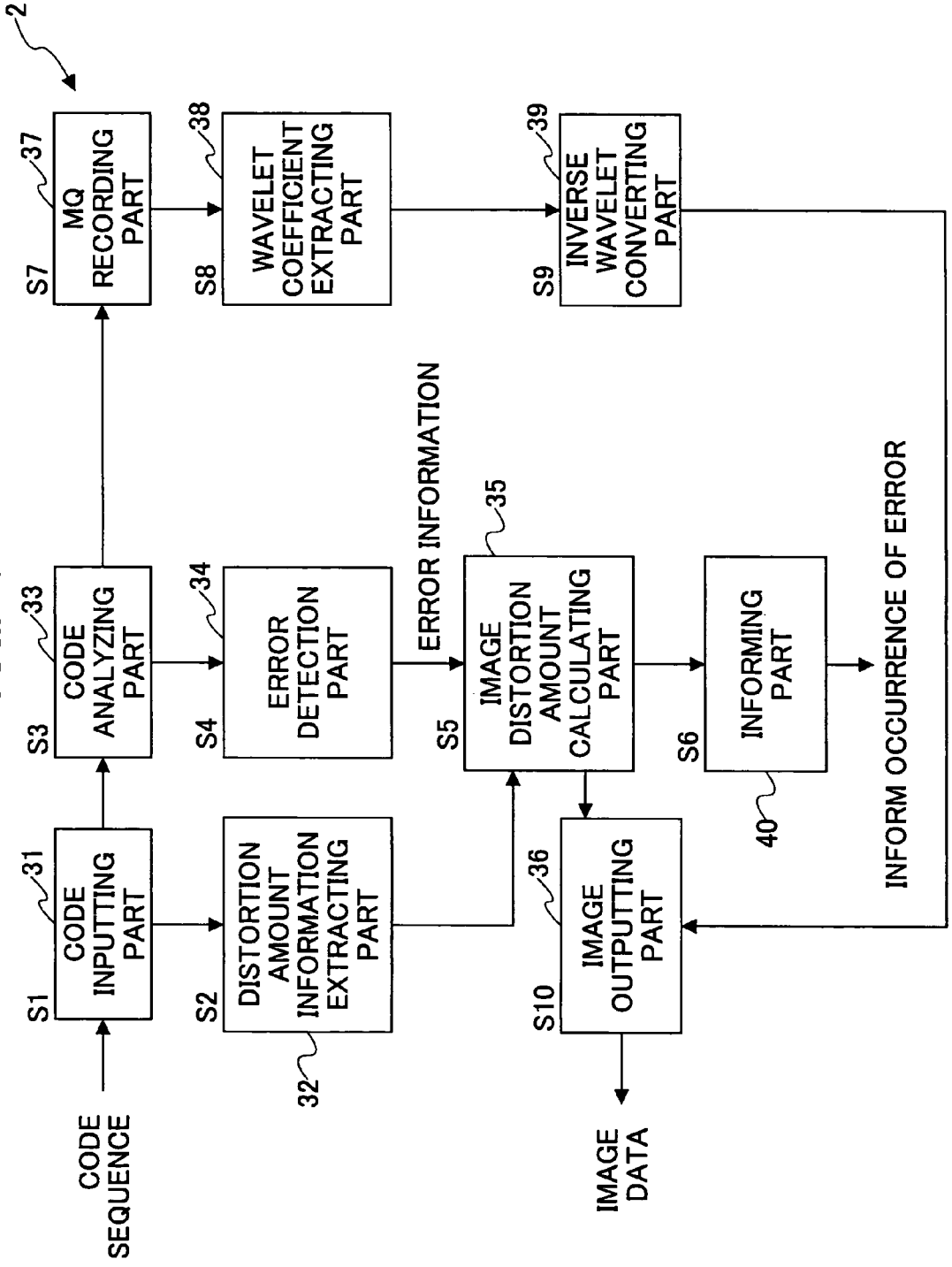

WAVELET COEFFICIENT
OF Y COMPONENT

WAVELET COEFFICIENT
OF Cb COMPONENT

WAVELET COEFFICIENT
OF Cr COMPONENT

WAVELET COEFFICIENT
OF Y COMPONENT

WAVELET COEFFICIENT
OF Cb COMPONENT

WAVELET COEFFICIENT
OF Cr COMPONENT

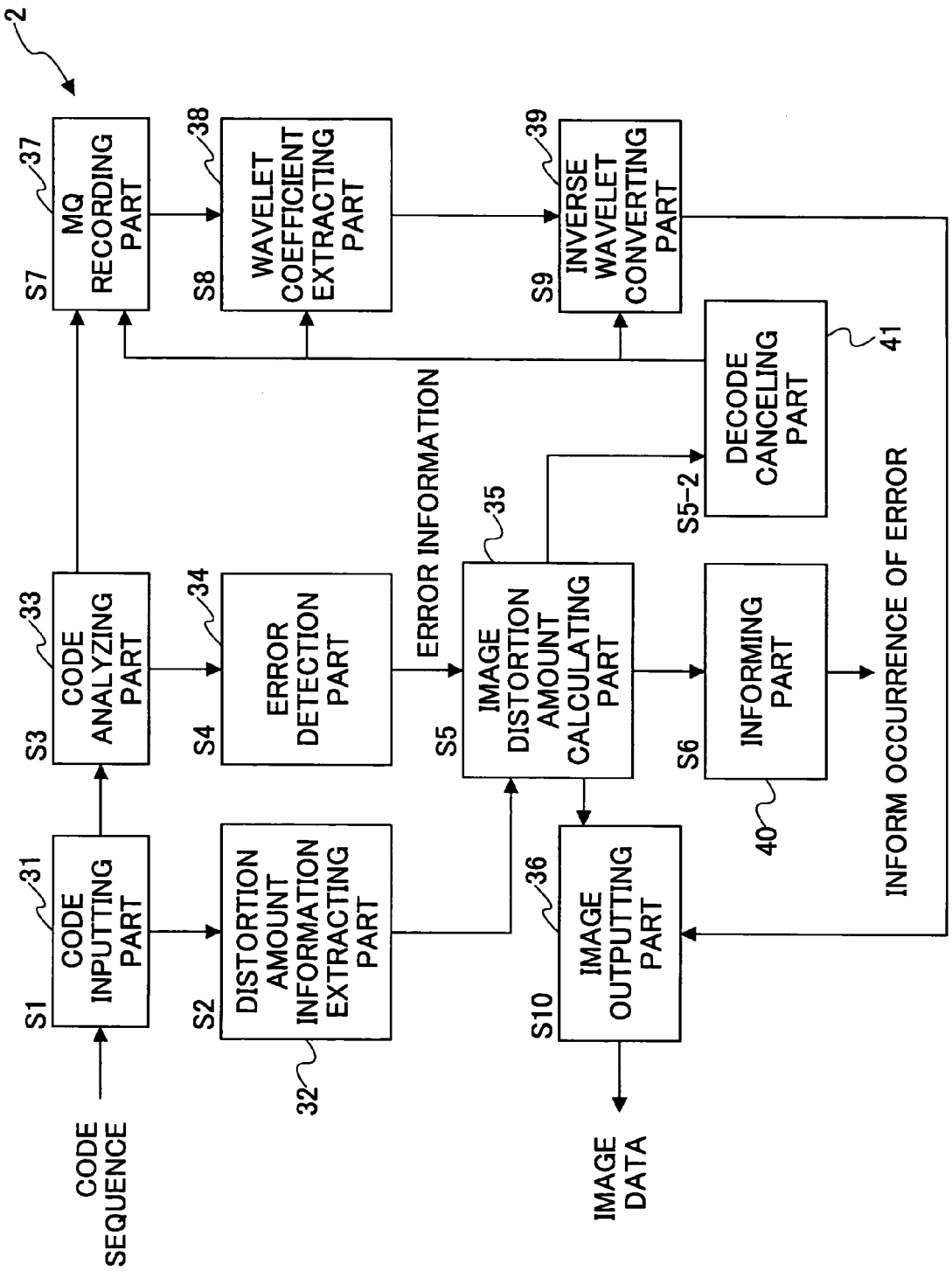

;# IMAGE PROCESSING APPARATUS FOR USING DISTORTION AMOUNT INFORMATION

The present application claims priority to the corresponding Japanese Application Nos. 2002-349595, filed on Dec. 2, 2002 and 2002-349640, filed on Dec. 2, 2002, the entire contents of which are hereby incorporated by reference.

BACKGROUND OF THE INVENTION

1. Field of the Invention

The present invention generally relates to an image processing apparatus for processing a code sequence compressing an image.

2. Description of the Related Art

The following technologies for transmitting image data are known as conventional technologies. Japanese Laid-Open Patent No. 2000-101537 discloses a technology in that an image is divided into several layers and an image quality is controlled based on a status of a network.

Japanese Laid-Open Patent No. 2001-274861 discloses another technology in that in a transmission of dynamic image data, a data frame is transmitted again when a priority of the data frame, which is dropped, of the dynamic image data received is higher than a threshold.

As an image compression technology capable of easily processing a high definition image, the JPEG 2000 is standardized.

There is a data structure of the code sequence in that when the occurrence of an error is detected in a code sequence while transmitting the code sequence compressing the image, only a code part where the error occurred in the code sequence is deleted and the image is decoded by using the code other than the code part, so that that decoded image having its own image quality can be obtained.

The JPEG 2000 recently standardized has this feature, and the code data are structured by a plurality of code units called packets. Even if an error occurs to one packet and this packed is deleted, all packets other than this packet are decoded so as to decode and restructure the entire image.

However, in a case in that several errors occur to the code sequence, or depending on a location of an error, even if the image is decoded by using the packets in which other errors do not occur, the image quality is significantly degraded and contents of the image cannot be recognized. In this case, the conventional technologies cannot determine whether or not the image decoded by using the packets other than error packets is economical, or whether or not the code sequence is needed to be provided again if it is determined that image decoded by using the packets other than error packets is not economical for use. Accordingly, it is inconvenience for a user.

SUMMARY OF THE INVENTION

An image processing apparatus is described. In one embodiment, the image processing apparatus comprises a reading unit to read distortion amount information showing how much a decoded image is degraded from an original image when data are eliminated from the data sequence, where the distortion amount information is included in a code sequence in which the original image is compressed and encoded in accordance with a method capable of progressively displaying the image. The image processing apparatus further comprises an error detecting unit to detect an occurrence of an error in each unit of the code sequence, a distortion amount calculating unit to calculate a distortion amount of the decoded image against the original image when the code sequence is decoded after the data are eliminated from the code sequence by using the distortion amount information concerning the data in which the error is detected by the error detecting unit, and a comparing unit to compare the distortion amount calculated by distortion amount calculating unit with a threshold.

BRIEF DESCRIPTION OF THE DRAWINGS

In the following, embodiments of the present invention will be described with reference to the accompanying drawings.

FIG. 1A through FIG. 1E are diagrams for illustrating a process for compressing and encoding image data in accordance with the JPEG 2000;

FIG. 3 is a diagram illustrating code blocks configuring a wavelet coefficient;

FIG. 8 is a diagram illustrating a case of an RLCP that is the data arrangement of the code sequence being compressed in accordance with the JPEG 2000;

FIG. 9 is a diagram illustrating a case of an RPCL that is the data arrangement of the code sequence being compressed in accordance with the JPEG 2000;

FIG. 10 is a diagram illustrating a case of an PCRL that is the data arrangement of the code sequence being compressed in accordance with the JPEG 2000;

FIG. 14 is a functional block diagram illustrating a process conducted by the client according to the present invention;

FIG. 16 is a functional block diagram illustrating a variation of the process conducted by the client according to the present invention.

DESCRIPTION OF THE PREFERRED EMBODIMENT

Figure 2A:
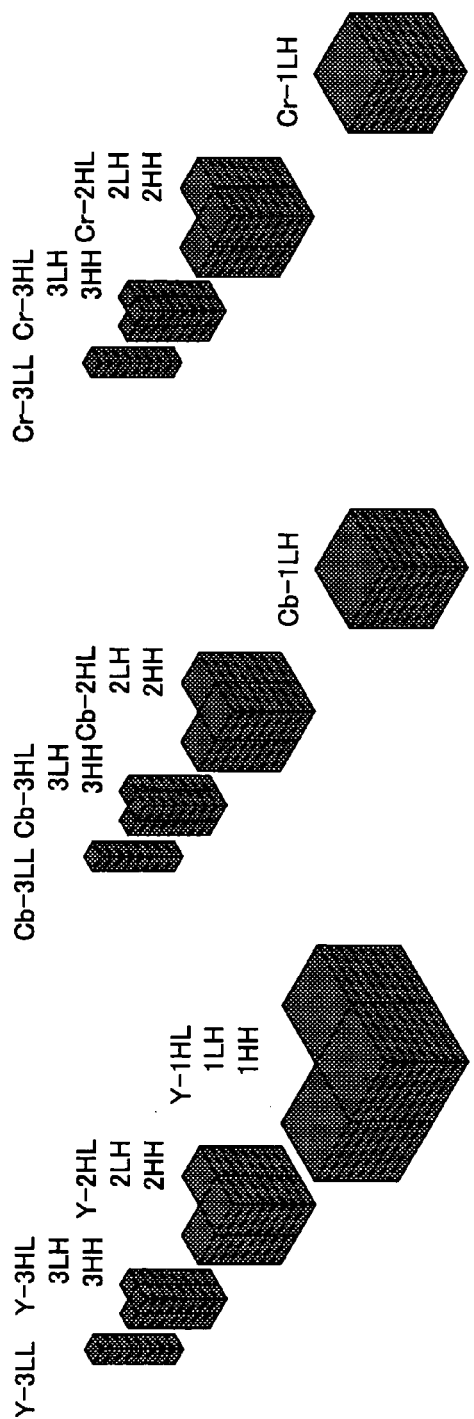
FIGS. 2A and 2B are diagrams illustrating Y, Cb, and Cr components that are divided into packets.

It is a general embodiment of the present invention to comprise an image processing apparatus in which the above-mentioned problems are eliminated.

A more specific embodiment of the present invention comprises the image processing apparatus that can obtain a distortion amount of an image if the image is progressively displayed by using data left after data units where errors occur in a code sequence are deleted and cancels a decoding process if it is determined that the distortion amount the image decoded can not be used, so as to improve an convenience of a user.

The above embodiment of the present invention are achieved by an image processing apparatus, including a reading unit reading distortion amount information showing how much a decoded image is degraded from an original image when data are eliminated from the data sequence, the distortion amount information included in a code sequence in which the original image is compressed and encoded in accordance with a method capable of progressively displaying the image; an error detecting unit to detect an occurrence of an error in each unit of the code sequence; a distortion amount calculating unit to calculate a distortion amount of the decoded image against the original image when the code sequence is decoded after the data are eliminated from the code sequence by using the distortion amount information concerning the data in which the error is detected by the error detecting unit; and a comparing unit to compare the distortion amount calculated by distortion amount calculating unit with a threshold.

According to the present invention, the distortion amount of the image can be obtained in a case in that data in which the error occurs are eliminated from the code sequence and the image data decoded from the code sequence other than the data are progressively displayed. Therefore, it is possible to determine whether or not the code sequence can be used to display.

The image processing apparatus may further include a decoding unit to decode the code sequence, an outputting unit to output image data is decoded when the distortion amount is less than the threshold as a result of the comparing unit, and a canceling unit to cancel the decoding unit to decode the code sequence so as not to output the image data is decoded.

According to one embodiment of the present invention, it is possible to cancel an unnecessary decoding process for the code sequence when it is determined that the code sequence cannot be used to display.

In one embodiment of the image processing apparatus, JPEG 2000 or Motion JPEG 2000 may be applied to the method and the each unit of the code sequence may be one packet as a unit in that the occurrence of the error is detected and the distortion information is used.

According to another embodiment of the present invention, the distortion amount of the image can be obtained in a case in that data in which the error occurs are eliminated from the code sequence compressed and encoded in accordance with JPEG 2000 or Motion JPEG 2000 and the image data decoded from the code sequence other than the data are progressively displayed. Therefore, it is possible to cancel an unnecessary decoding process for the code sequence when it is determined that the code sequence cannot be used to display.

In another embodiment of the image processing apparatus, the distortion calculating unit may calculate a total distortion amount of the decoded image against the original image by accumulating the distortion amount of the each unit of the code sequence.

According to the present invention, it is possible to easily obtain the distortion amount of the image.

The image processing apparatus may include an informing unit to inform a user that the error occurred to the image, when the distortion amount is more than the threshold.

According to one embodiment of the present invention, it is possible to inform a user of the occurrence of the error when it is determined that the distortion amount exceeds too much to display by encoding the code sequence.

The above embodiments of the present invention can be achieved by a program code for causing a computer to conduct processes described above in the image processing apparatus or by a computer-readable recording medium recorded with the program code.

Overview of JPEG 2000 Algorithm

As shown in FIG. 1, in the JPEG 2000 method, an image is divided into 128×128 tiles 101(*a*), converts each tile 101 in accordance with a wavelet conversion (*b*), and classifies the files 101 into a wavelet coefficient 102(*c*). Then, the wavelet coefficient 102 is divided into bit planes 103(*d*). LSB components are lower bit planes that are eliminated for each code block or a code block is eliminated (truncation), so that the entire code amount can be compressed to be smaller (*e*).

In a case of a color image, R, G, and B components are classified into Y, Cb, and Cr components. For each color component, the process described with reference to FIG. 1 is conducted and code data is managed by a packet as a unit. In FIG. 2A, a case in that each of Y, Cb, and Cr components is divided into packets is illustrated.

An area of one wavelet coefficient is segmented into a smaller unit such as a code block and a packet is formed by each code block. In FIG. 3, the code blocks are illustrated. Each of elements numbered from 0 to 258 is the code block.

In FIG. 3, data LL5 of a packet 1 are a number 0, data HL5, LH5, and HH5 of a packet 2 are numbers 1 through 3, data HL4, LH4, and HH4 of a packet 3 are numbers 4 through 6, data HL3, LH3, and HH3 of a packet 4 are numbers 7 through 10, 11 through 14, and 15 through 18, data HL2, LH2, and HH2 are numbers 19 through 34, 35 through 50, and 51 through 66, and data HL1, LH1, and HH1 of a packet 6 are numbers 67 through 130, 131 through 194, and 195 through 258.

Figure 4:
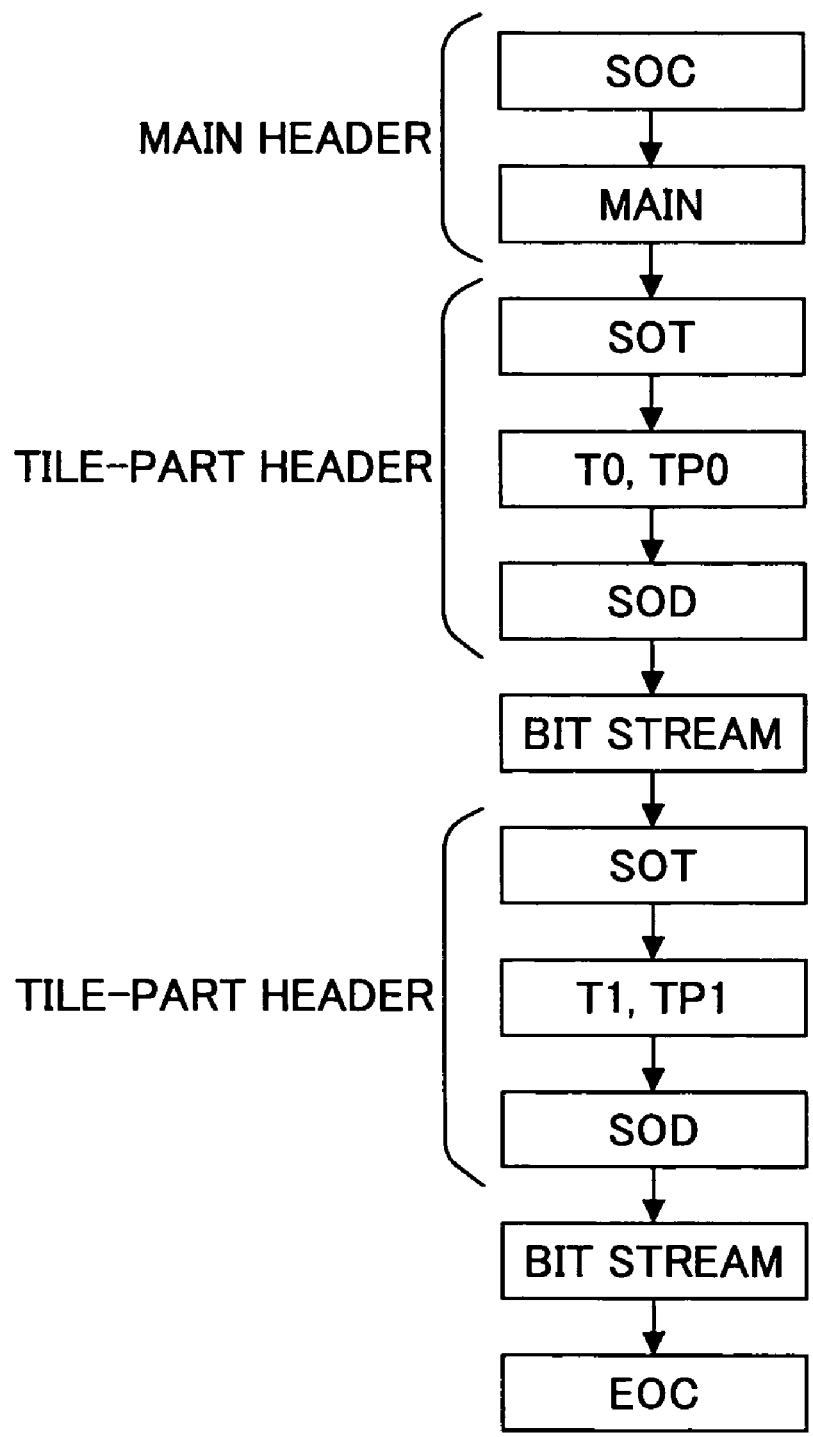
FIG. 4 is a block diagram illustrating the entire code format of the JPEG 2000.

FIG. 4 shows the entire code format of the JPEG 2000. As shown in FIG. 4, a code sequence of the JPEG 2000 includes a main header located at a beginning thereof, one or more combinations of a tile part header and a bit stream successively located after the main header, and an EOC (End Of Code stream) located at an end thereof.

Figure 5:
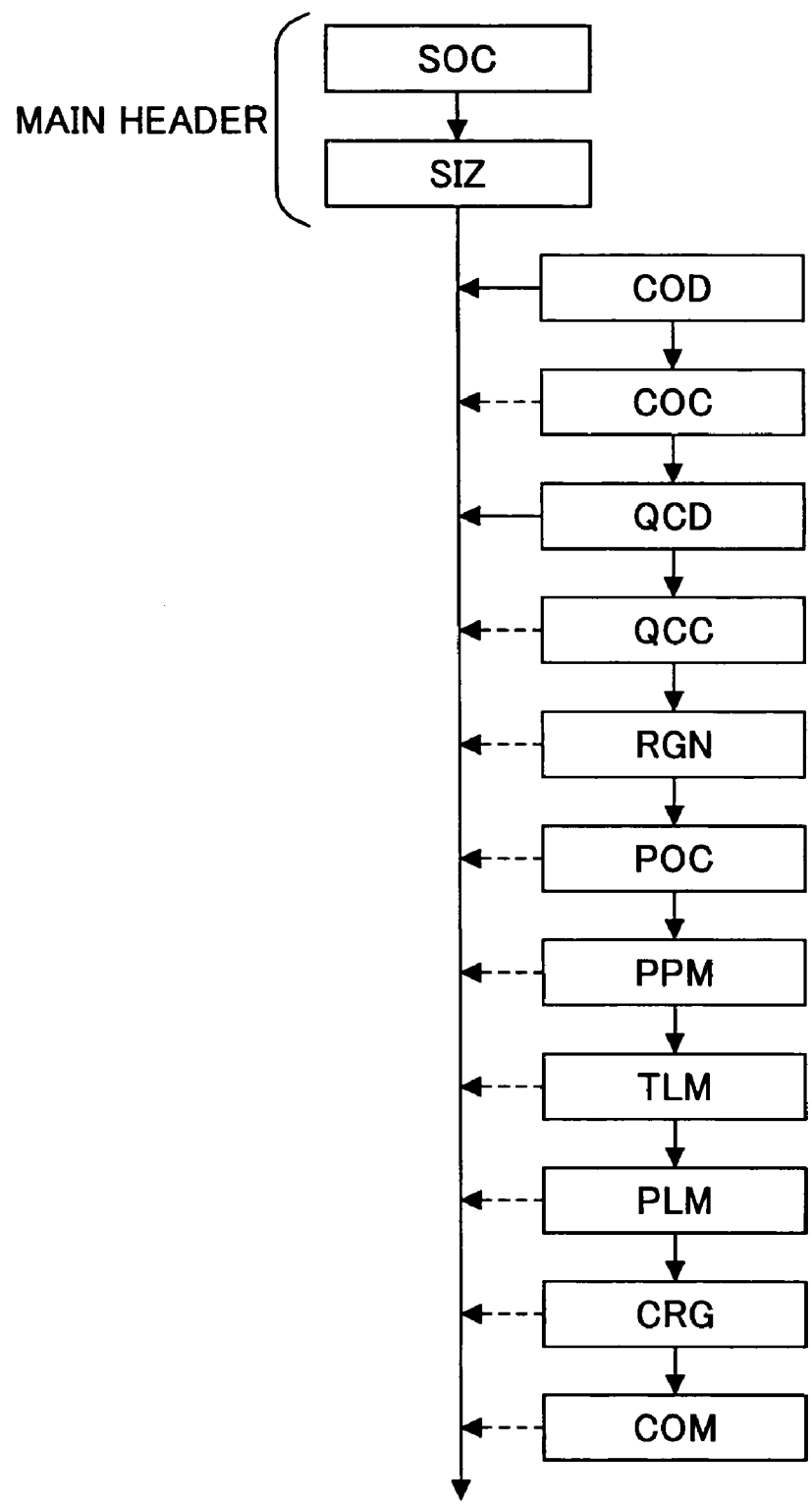
FIG. 5 is a block diagram illustrating a code format of a main header unit in the entire code format.
Figure 6:
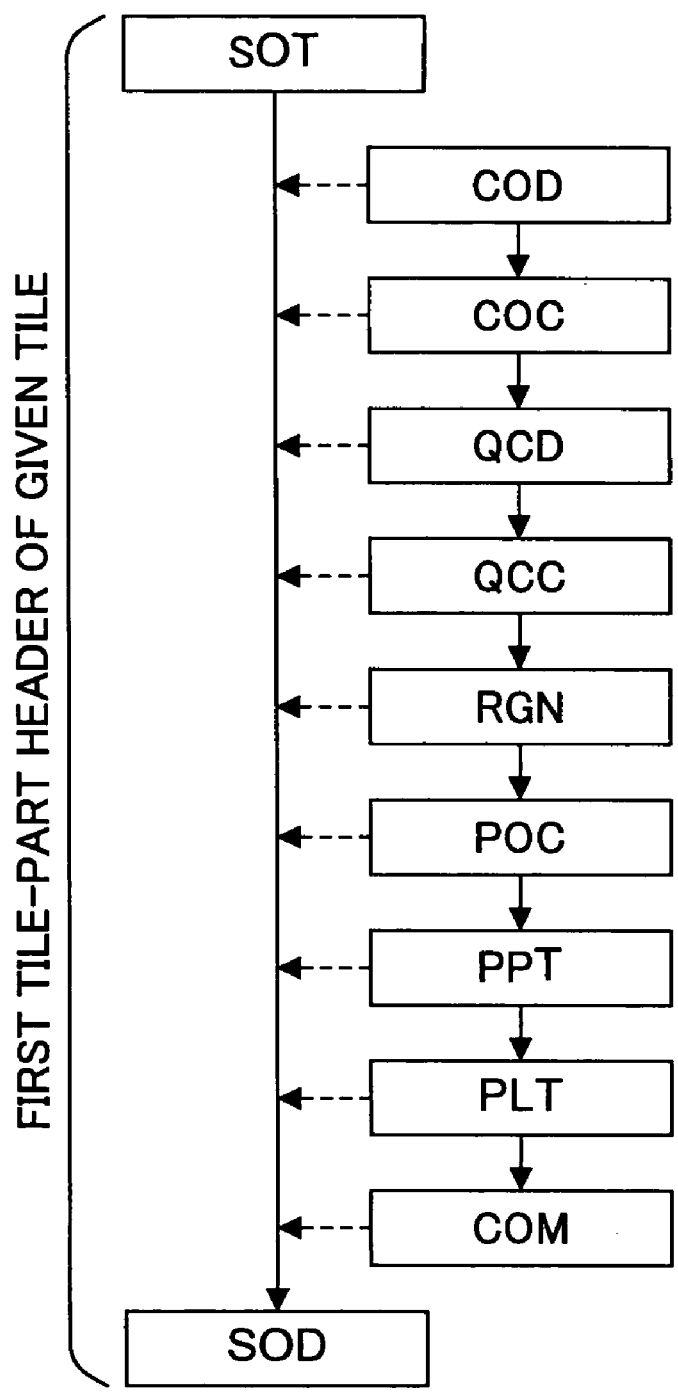
FIG. 6 is a block diagram illustrating a configuration of a tile part header unit in the entire code format.

FIG. 5 shows a code format of the main header in the entire code format. Further, FIG. 6 shows a configuration of the tile part header. In the JPEG 2000, the code starts from a SOC (Start Of Code), and a SIZ (SIZe) is mandatory provided. Next, the main header is arranged and the main header mandatory includes a COD (Code Of Default) and a QCD (Quantization Code Default) marker and optionally includes other markers. Each of markers other than the SIZ marker is arbitrarily arranged. The tile part header starts from a SOT (Start Of Tile) and ends at a SOD (Start Of Data) after other markers are optionally arranged as necessity. After the SOD marker, the code data are arranged. In each of the main header and the tile part header, a COM (COMment) marker can be arranged so that a user can arbitrarily store information. In the JPEG 2000, the code sequence described above is configured by packets that are a unit, and an order of packets can be arbitrarily selected. This is called a progressive order. The progressive order is ruled by the COD marker as the following five rules:

Layer-resolution level-component-position (LRCP)
Resolution level-layer-component-position (RLCP)
Resolution level-position-component-layer (RPCL)
Position-component-resolution level-layer (PCRL)
Component-position-resolution level-layer (CPRL)

For example, in a case of Resolution level-position-component-layer (RPCL), a loop nest for parameters starts from a left side as follows:

```
for (res=0; res < RES; res++){
    for(pos =0; pos < POS; pos++){
        for (com=0; com < COM; com++){
            for (lay=0; lay < LAY; lay++){
            }
        }
    }
}
```

In the JPEG 2000, it is possible to change the order of a progressive display, for example, so as to display an upper side of the bit plane with higher priority for each color. In this case, a display is conducted from an upper layer sequentially. In accordance with this progressive display, a data arrangement of the code sequence after compressed by the JPEG 2000 method will be illustrated in FIG. 7 through FIG. 10.

Figure 7:
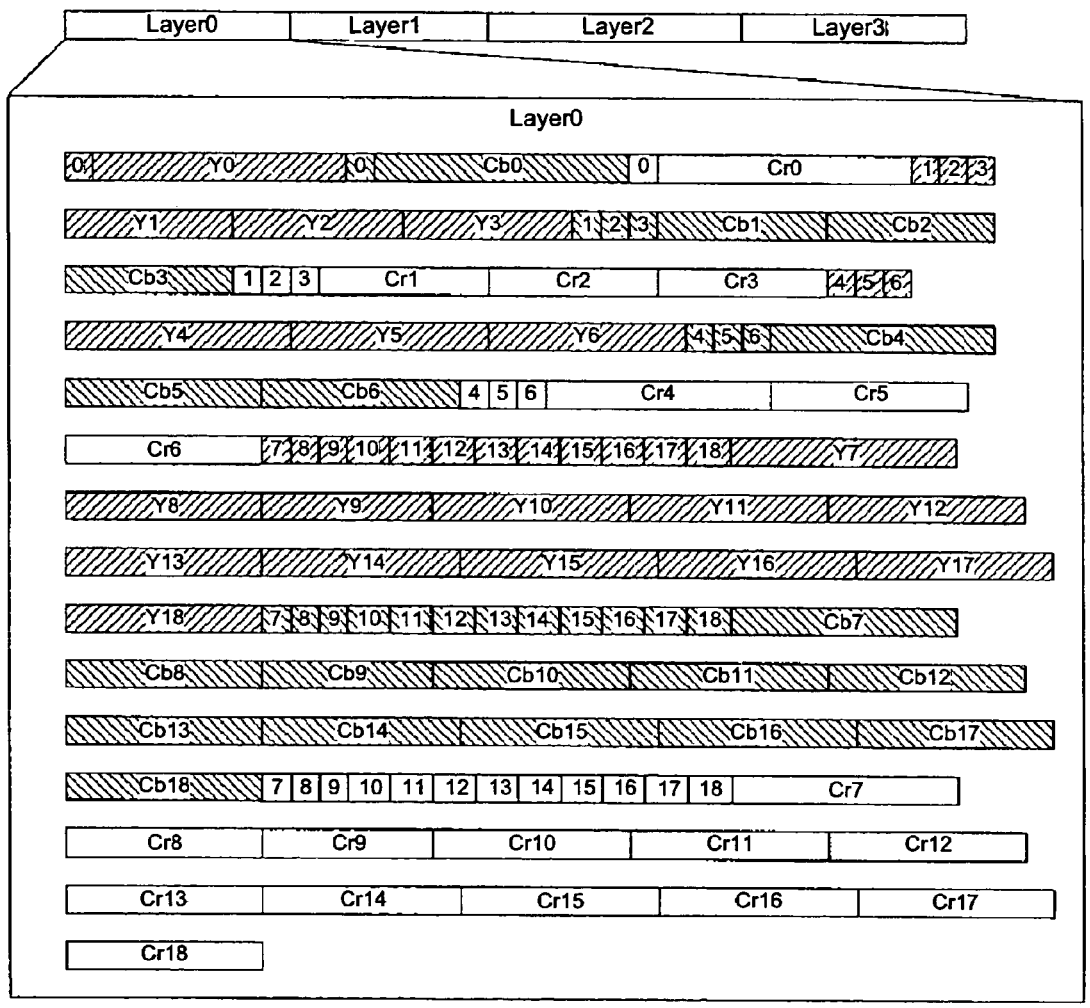
FIG. 7 is a diagram illustrating a case of an LRCP that is a data arrangement of a code sequence being compressed in accordance with the JPEG 2000.

FIG. 7 shows a case of the LRCP. As shown in FIG. 7, first, a packet header Y0 of an LL component of the highest level of a component Y is arranged and then packet data of the packet header Y0 are arranged. Subsequently, a packet header Cb0 of the LL component of the highest level of the component Cb is arranged and packet data of the packet header Cb0 are arranged. Subsequently, a packet header Cr0 of the LL component of the highest level of the component Cr is arranged and then packet data of the packet header Cr0 are arranged. After that, three packet headers of the HL, LH, and HH components of the highest level of the component Y are arranged. After that, packet data Y1, Y2, and Y3 of the HL, HL, and HH components are arranged. Subsequently, packet data of the HL, LH, and HH components of the highest level of the component Cb are arranged. Subsequently, packet data Cb1, Cb2, and Cb3 of the HL, LH, HH components are arranged. Subsequently, packet data of the HL, LH, HH components of the highest level of the component Cr are arranged, and then packet data Cr1, Cr2, and Cr3 of the HL, LH, and HH components are arranged. In the same manner, packet data are arranged following to packet headers of sub bands of the HL, LH, and HH components of each lower level. When a layer 0 is processed in this manner, a layer 1 is processed and then all layers are processed by repeating this manner.

FIG. 8 shows a case of the RCLP. As shown in FIG. 8, first, a packet header of the layer 0 of the LL component of the highest level of the component Y is arranged, and next, packet data are arranged. Subsequently, a packet header of the layer 0 of the LL component of the highest level of the component Cb is arranged and packet data are arranged. Subsequently, a packet header of the layer 0 of the component Cr is arranged and packet data are arranged. The same manner is repeated for layers 1 and 2, and all layers. After all layers are processed in the same manner, a packet header of the layer 0 of the HL, LH, and HH components of the highest level of the component Y is arranged, and then packet data are arranged. The same manner is repeated for the components Cb and Cr. Also, the same manner is repeated for all layers and all levels.

FIG. 9 shows a case of the RPCL. As shown in FIG. 9, a packet header and packet data of the layer 0 of the LL component of the highest level of the component Y are arranged. Subsequently, a packet header and packet data of the layer 1 of the LL component are arranged. And the same manner is repeated for all layers. Also, the same manner is repeated for the components Cb and Cr. Next, a packet header of the layer 0 of the HL, LH, and HH components of the highest level of the component Y is arranged and subsequently packet data are arranged. After the same manner is repeated for all layers of the component Y, the same manner is repeated for the components Cb and Cr. Then, the same manner is repeated from the higher level to the lowest level.

FIG. 10 shows a case of the PCRL. As shown in FIG. 10, a packet header of the LL component of the layer 0 of the highest level of the component Y is arranged and then packet data are arranged. The same manner is repeated for all layers. Next, a packet header of the HL, LH, and HH components of the layer 0 of the highest level of the same component Y is arranged and then packet data are arranged. The same manner is repeated for all layers and then all levels. After the same manner is repeated for the component Y, the same manner is repeated for the components Cb and Cr.

An Embodiment of the Present Invention

Figure 11:
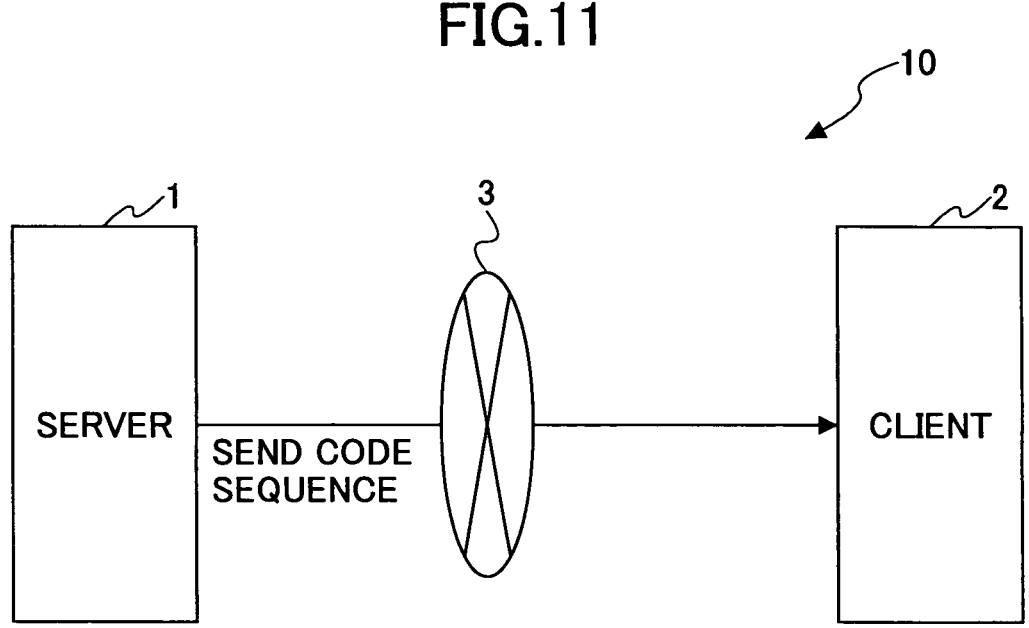
FIG. 11 is a block diagram illustrating the entire configuration of a network system according to an embodiment of the present invention.

FIG. 11 is a block diagram showing a network system 10 according to an embodiment of the present invention. As shown in FIG. 11, the network system 10 includes a server 1 for transmitting a code sequence that is compressed and encoded in accordance with an algorithm such as the JPEG 2000, the Motion JPEG 2000, or a like, which enables to progressively display an static image and a dynamic image, through a network 3 such as the Internet, and a client 2 for receiving the code sequence from the server 1.

The server 1 sends the code sequence, which is compressed and encoded in accordance with the algorithm such as the JPEG 2000, the Motion JPEG 2000, or a like, to the client 2. A header of the code sequence stores information showing a distortion amount of the image by the code sequence (degraded amount of a decoded image to an original image in a case of eliminating data packets having an error (truncation)). The information is stored in the code sequence by the server 1. Next, a process for creating the code sequence will be described.

Figure 12:
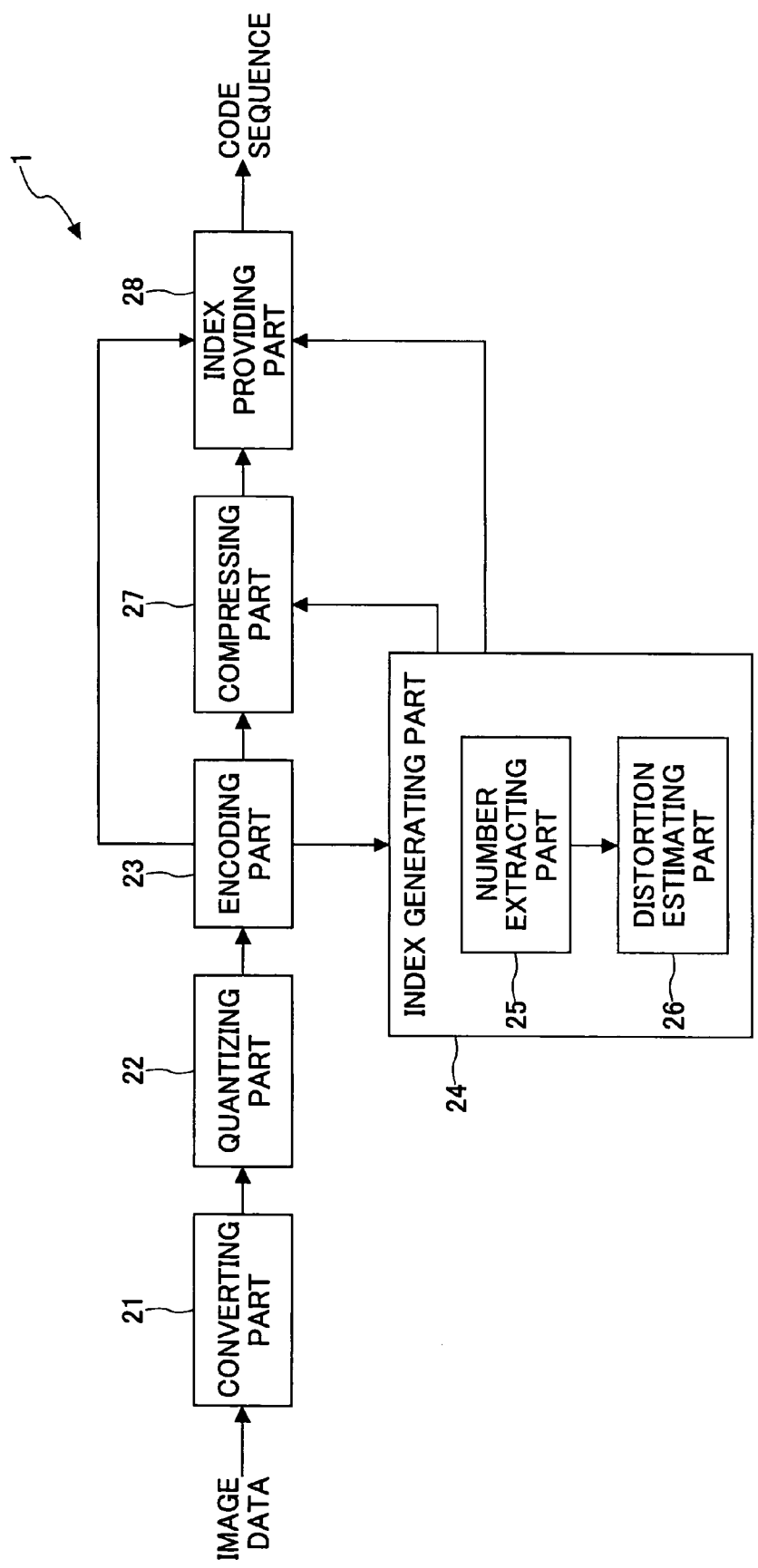
FIG. 12 is a functional block diagram illustrating a process conducted by a server according to the embodiment of the present invention.

FIG. 12 is a block diagram showing a functional configuration of the server 1 that conducts the process for creating the code sequence. That is, image data are converted by a converting unit 21 applying a discrete wavelet conversion, quantized by a quantizing unit 22, encoded by an encoding unit 23 applying an entropy encode, and then becomes a code sequence.

Data of a wavelet coefficient before the entropy encoding process is conducted for each bit plane are input into an index generating unit 24 from the encoding unit 23. A number extracting unit 25 of the index generating unit 24 the number Na of MSBs in each bit plane. A distortion estimating unit 26 estimates a distortion amount of the image from the number Na (in detail, a ratio of the distortion amount of the image after decoded to the original image is estimated). For example, the distortion amount calculates a total of summation of the number Na of each bit plane and a level of each bit plane in a case of truncation from the bit plane 1 through the bit plane n, to estimate the distortion amount of the image.

The data of the wavelet coefficient are input from the encoding unit 23 to a compressing unit 27 after the entropy encoding process is conducted for each bit plane by the encoding unit 23. And the index generating unit 24 inputs an index value generated beforehand (estimated value of the distortion amount described above) to the compressing unit 27. The compressing unit 27 determines a bit plane, to which the truncation is conducted, based on this index value, and conducts the truncation to the bit plane. For example, a predetermined threshold is defined for each bit plane beforehand. With respect to the index value generated for each bit plane beforehand by the index generating unit 24, an index value and the predetermined threshold concerning a first bit plane are compared with each other, an index value and the predetermined threshold concerning a second bit plane are compared with each other, an index value and the predetermined threshold concerning a third bit plane are compared with each other, and . . . . Sequentially, the index value and the threshold concerning each bit plane are compared. When the index value becomes higher than the threshold at an nth bit plane, it is determined that the truncation is conducted for the first to the nth bit planes. Then, the truncation is conducted to the second to the nth bit planes (the truncation is not conducted when n=1). In this case, the threshold may be defined to be the same for all bit planes. Alternatively, the threshold may be defined to be different for each bit plane.

An index providing unit 28 stores an estimated value of the distortion amount to the main header of the code sequence generated as described above. The estimated value of the distortion amount may be set as a comment in the main header of the code sequence.

Figure 13:
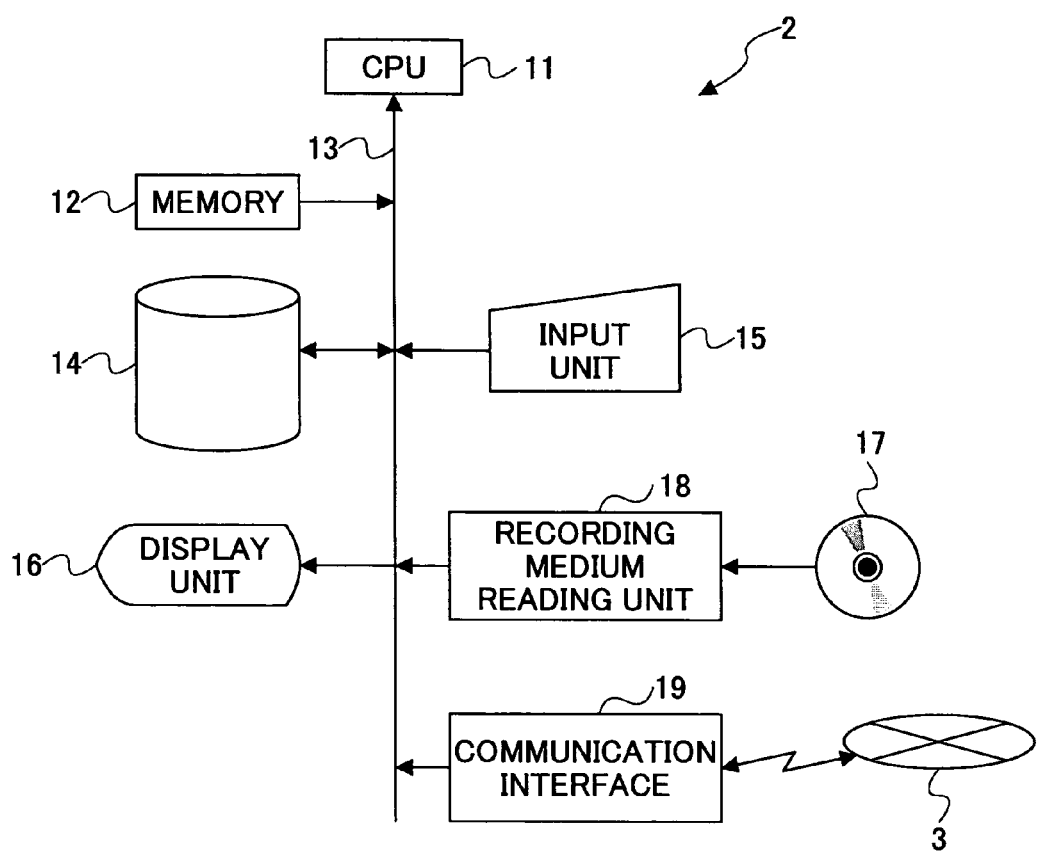
FIG. 13 is a block diagram illustrating an electric connection of a client according to the embodiment of the present invention.

FIG. 13 is a block diagram showing an electric connection of the client 2. As shown in FIG. 13, the client 2 realizes the image processing apparatus according to the embodiment of the present invention, and includes a CPU (Central Processing Unit) 11 for conducting various operations and controlling each unit of the client 2, a memory 12 including various ROMs and RAMs, a storage unit 14 such as a hard disk or a like, an input unit 15 including a mouse and a keyboard, a display unit 16 such as an LCD (Liquid Crystal Display) or a CRT (Cathode Ray Tube), a recording medium reading unit 18 for reading a recording medium such as an optical disk implementing a recording medium of the present invention, and a communication interface 19 as a communicating unit for communicating through a network 3, which are mutually connected via a bus 13.

As the recording medium 17, an optical disk such as CD (Compact Disk) or DVD (Digital Versatile Disk), a magneto-optical disk, a flexible disk, and media of various methods can be used. In addition, as the recording medium reading unit 18, an optical disk drive, a magneto-optical disk drive, a flexible disk drive, and a like can be used based on a type of the recording medium 17.

The magneto-optical storage unit 14 stores an image receiving program implementing a program of the present invention. In general, the image receiving program may be installed into the client 2 from the recording medium 17 implementing the recording medium of the present invention by the recording medium reading unit 18 or may be installed into the magneto-optical recoding medium 14 by downloading through the network 3. Then, the client 2 can be activated by installing the image receiving program. The image receiving program can be a part of specific application software or can be operative on a predetermined OS. Also, the server 1 may have the same hardware configuration as the client 2 as described above. Instead of installing the image receiving program, an image sending program may be installed into the server 1 to send an image to the client 2.

Next, a process conducted by the client 2 in accordance with the image receiving program will be described.

FIG. 14 is a functional block diagram showing the process conducted by the client 2 based on the image receiving program according to the embodiment of the present invention. The code sequence of the image received from the server 1 through the communication interface 19 is input into the code inputting unit 31 (step S1). A distortion amount information extracting unit (realizing a reading unit in claims) extracts information (distortion information) concerning the distortion amount of the image stored in the main header of the code sequence as described above (step S2). Then, the code sequence is sequentially input into a code analyzing unit 33 for analyzing the code sequence (step S3). An error detecting unit 34 (realizing an error detecting unit in claims) detects an occurrence of an error in the code sequence analyzed by the code analyzing unit 33 (step S4). When errors occur in units of the code sequence that are progressively aligned as shown in FIG. 7 through FIG. 10, it is determined that each error occurs at a location of the code sequence where the code analyzing unit 33 is analyzing. Accordingly, the occurrence of the error and the location where the error occurs can be determined.

In detail, the code analyzing unit 33 sequentially analyzes the packet headers and the packet data in accordance with the progressive order of the code sequence of the JPEG 2000 as described above. Since a data length of the packet data is set by byte prior to data in the packet data, the code analyzing unit 33 recognizes a boundary between the packet header and the packet data. If there is an error in the code data and bytes set in the packet header and bytes of the packet data actually inputted to the code analyzing unit 33 are different each other, the code analyzing unit 33 starts to analyze the packet data as the packet header incorrectly because the code analyzing unit 33 can not recognize a different between the packet header and the packet data. In this case, it becomes impossible for the code analyzing unit 33 to continue properly analyzing the code sequence. In order to avoid this state, an EPH (End of Packet Header) mark is arranged at the end of each packet in the JPEG 2000. The EPH marker is arranged after the packet header. After the code analyzing unit 33 analyzes the packet header, the code analyzing unit 33 detects the EPH maker. When the EPH marker is not detected, the error detecting unit 34 determined that the error occurs in the code sequence. Also, when the EPH marker is detected at an unexpected location while the packet data is read, the error detecting unit 34 determines that the error occurs at this location.

Figure 15A:
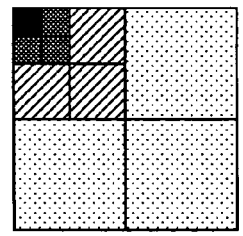
FIG. 15A is a diagram illustrating the wavelet coefficient of Y component in a case in which there is not an error.
Figure 15B:
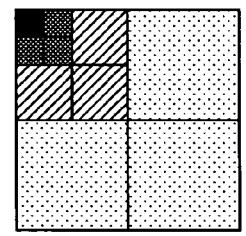
FIG. 15B is a diagram illustrating the wavelet coefficient of Cb component in a case in which there is not an error.
Figure 15C:
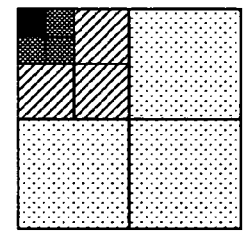
FIG. 15C is a diagram illustrating the wavelet coefficient of Cr component in a case in which there is not an error.
Figure 15D:
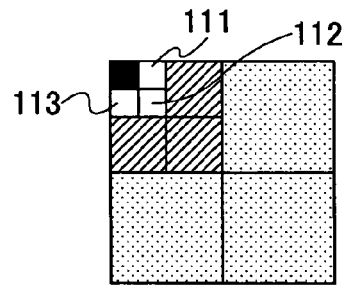
FIG. 15D is a diagram illustrating the wavelet coefficient of Y component in a case in which there is an error.
Figure 15E:
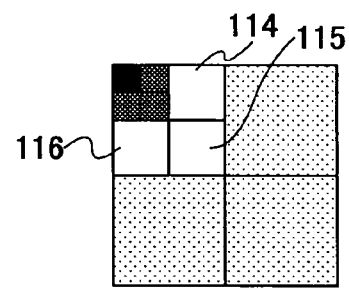
FIG. 15E is a diagram illustrating the wavelet coefficient of Cb component in a case in which there is an error.
Figure 15F:
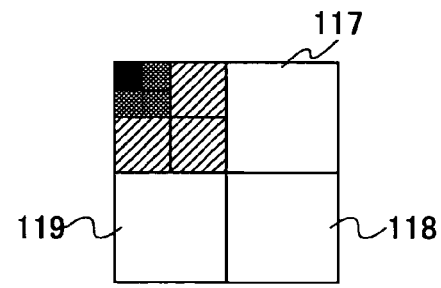
FIG. 15F is a diagram illustrating the wavelet coefficient of Cr component in a case in which there is an error.

For example, the wavelet coefficient for each component is illustrated in a case in that there is no error in FIGS. 15A, 15B, and 15C, respectively. On the other hand, the wave let coefficient for each component is illustrated in a case in that an error occurs at a part of the bit plane in FIGS. 15D, 15E, and 15F, respectively. In this example, the error occurs in 3HL, 3LH, and 3HH components 111, 112, and 113 of Y component, the error occurs in 2HL, 2LH, and 2HH components 114, 115, and 116 of Cb component, and the error occurs in 1HL, 1LH, and 1HH components 117, 118, and 119 of Cr component.

Figure 2B:
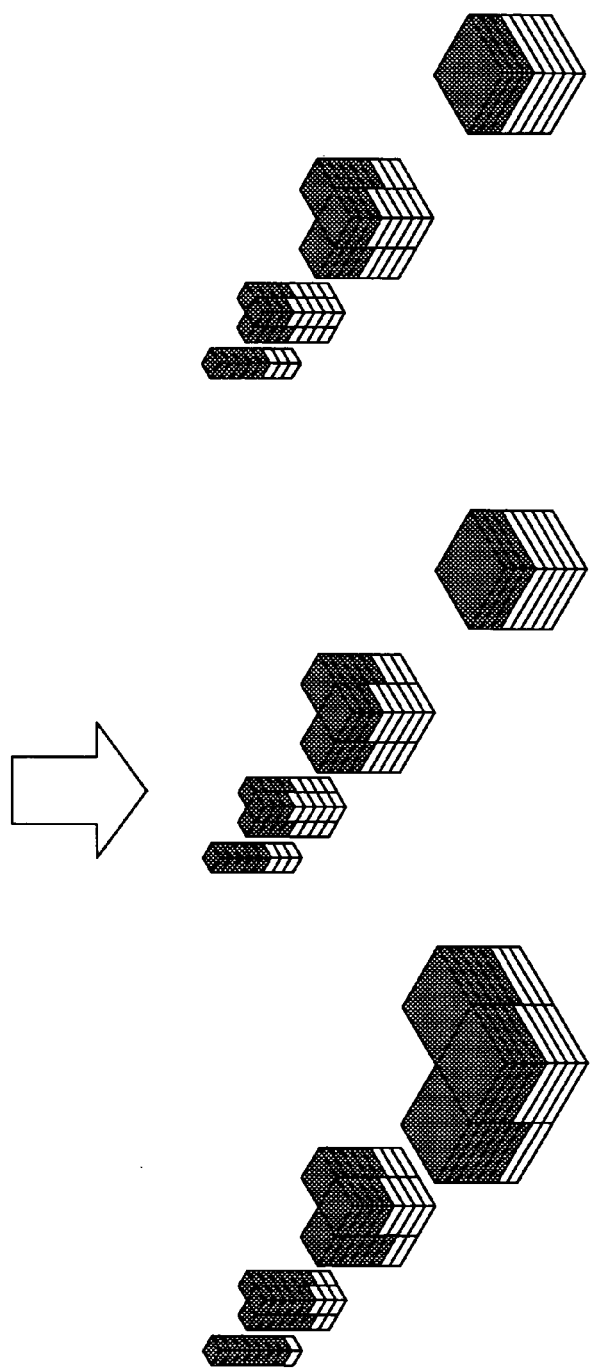

As described above, in the JPEG 2000, even if bit plane information is partially lost (a state of luck of a part (white portion) of the bit plane is illustrated in FIG. 2), or even if sub band information is partially lost, it is possible to reproduce the image by decoding the code sequence by using information other than the lost portion. However, because of the lost portion, the image quality of the reproduced image may be significantly degraded more than the original image. Therefore, the client 2 according to the present invention conducts the following process.

That is, when the error is detected as described above, an image distortion calculating unit 35 (realizing a distortion amount calculating unit in claims) calculates the distortion amount that may occur in the entire of the image after the unit of packet data including an error is eliminated, by using distortion amount information detected beforehand by the distortion amount information extracting unit 32 (step S5). In detail, the distortion information for each packet in which the error occurs is referred, and the distortion amount for each packet is accumulated. The accumulated value can be an index showing how much distortion may be caused for the entire image. The image distortion amount calculating unit 35 (also realizing a comparing unit in claims) compares the accumulated value with a predetermined reference value. When the distortion amount is less than a threshold and it is determined that the distortion of the image is not excessive, an image outputting unit 36 (realizing an outputting unit in claims) outputs the image data in which the code sequence is decoded (step S10). An MQ decoding unit 37, a wavelet coefficient extracting unit 38, and an inverse wavelet converting unit 39 realize a decoding unit in claims. That is, the MQ decoding unit 37 conducts an MQ decoding process with respect to the code sequence (step S7), the wavelet coefficient extracting unit 38 extracts the wavelet coefficient (step S8), the inverse wavelet converting unit 39 conducts a wavelet converting process (step S9), and then the image data being decoded are output (step S10).

On the other hand, when the distortion amount is more than the threshold and it is determined that the distortion of the image is too much to be used, an informing unit 40 (realizing an informing unit in claims) informs the occurrence of the error (for example, it is possible to inform by displaying a message at the display unit 16) (step S6).

FIG. 16 is a functional block diagram showing a variation of the process conducted by the client 2 based on the image receiving program according to the embodiment of the present invention. In FIG. 16, units that are the same as the ones in FIG. 14 are indicated by the same reference numerals and the explanation thereof will be omitted.

In step S5, when the distortion amount is more than the threshold and it is determined that the distortion of the image is too much to be used, a decode canceling unit 41 cancels (stops) the MQ decoding unit 37, the wavelet coefficient extracting unit 38, and the inverse wavelet converting unit 39 to conduct the decoding process for the code sequence. Also, the informing unit 40 informs the occurrence of the error (for example, it is possible to inform by displaying a message at the display unit 16) (step S6).

According to an embodiment of the present invention, the distortion amount of the image can be obtained in a case in that data in which the error occurs are eliminated from the code sequence and the image data decoded from the code sequence other than the data are progressively displayed. Therefore, it is possible to determine whether or not the code sequence can be used to display.

Moreover, it is possible to cancel an unnecessary decoding process for the code sequence when it is determined that the code sequence cannot be used to display.

Furthermore, it is possible to inform a user of the occurrence of the error when it is determined that the distortion amount exceeds too much to display by encoding the code sequence.

The present invention is not limited to the specifically disclosed embodiments, and variations and modifications may be made without departing from the scope of the present invention.

The present application is based on the Japanese priority applications No. 2002-349595 filed on Dec. 2, 2002 and No. 2002-349640 filed on Dec. 2, 2003, the entire contents of which are hereby incorporated by reference.

What is claimed is:

1. An image processing apparatus, comprising:
    a reading unit to read estimated distortion amount information showing how much a decoded image is degraded from an original image when data are eliminated from a data sequence, the estimated distortion amount information being included in a code sequence for progressively displaying the image, in which the original image is compressed and encoded in accordance with a method capable of progressively displaying the image;
    an error detecting unit to detect an occurrence of an error in header information for each unit of the code sequence based on a location of an end of packet header marker;
    a distortion amount calculating unit to calculate a distortion amount of the decoded image against the original image when the code sequence is decoded after the data are eliminated from the code sequence by using the estimated distortion amount information concerning the data in which the error is detected by the error detecting unit; and
    a comparing unit to compare the distortion amount calculated by distortion amount calculating unit with a threshold and determine whether the code sequence should be decoded or not based on the comparison result.

2. The image processing apparatus as claimed in claim 1, further comprising:
    a decoding unit to decode the code sequence;
    an outputting unit to output image data being decoded when the distortion amount is less than the threshold as a result of the comparing unit; and
    a canceling unit to cancel the decoding unit to decode the code sequence so as not to output the image data being decoded.

3. The image processing apparatus as claimed in claim 1, wherein JPEG 2000 or Motion JPEG 2000 is applied to the method and the each unit of the code sequence is one packet as a unit in that the occurrence of the error is detected and the estimated distortion information is used.

4. The image processing apparatus as claimed in claim 1, wherein the distortion calculating unit calculates a total distortion amount of the decoded image against the original image by accumulating the distortion amount of the each unit of the code sequence.

5. The image processing apparatus as claimed in claim 1, further comprising an informing unit to inform a user that the error occurred to the image, when the distortion amount is more than the threshold.

6. A computer readable recording medium storing instructions thereon which, when executed by a computer, cause the computer to process an image using a method comprising:
    reading estimated distortion amount information showing how much a decoded image is degraded from an original image when data are eliminated from the data sequence, the estimated distortion amount information included in a code sequence for progressively displaying the image, in which the original image is compressed and encoded in accordance with a method capable of progressively displaying the image;

detecting an occurrence of an error in header information for each unit of the code sequence based on a location of an end of packet header marker;

calculating a distortion amount of the decoded image against the original image when the code sequence is decoded after the data are eliminated from the code sequence by using the estimated distortion amount information concerning the data in which the error is detected in the decoding step;

comparing the distortion amount calculated in the calculating step with a threshold; and determining whether the code sequence should be decoded or not based on the comparison result.

7. The computer readable recording medium as claimed in claim 6, the method further comprising:

decoding the code sequence when the distortion amount is less than the threshold as a result of the comparison; and outputting image data being decoded.

* * * * *